(12) United States Patent
Gansner

(10) Patent No.: US 8,447,713 B1
(45) Date of Patent: *May 21, 2013

(54) AUTOMATED LEGAL EVALUATION USING A NEURAL NETWORK OVER A COMMUNICATIONS NETWORK

(76) Inventor: Harvey L. Gansner, Smithers (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/428,244

(22) Filed: Mar. 23, 2012

(51) Int. Cl.
  *G06E 1/00* (2006.01)
  *G06E 3/00* (2006.01)
  *G06F 15/18* (2006.01)
  *G06G 7/00* (2006.01)

(52) U.S. Cl.
  USPC ............................................................ 706/20

(58) Field of Classification Search
  None
  See application file for complete search history.

(56) References Cited

U.S. PATENT DOCUMENTS

| | | | |
|---|---|---|---|
| 2005/0050094 A1* | 3/2005 | Cordery et al. | 707/104.1 |
| 2009/0226872 A1* | 9/2009 | Gunther | 434/350 |

OTHER PUBLICATIONS

'The "Jury Observation Fallacy" and the use of Bayesian networks to present probabilistic legal arguments': Fenton, Mathematics today (Bulletin of the IMA, 36(6)), 180-187, 2000 revised Jul. 2007.*
'Use of Bayesian belief networks in legal reasoning': Huygen, 2002, BILETA, 17th BILETA conference.*
'Networks at work': Opdorp, ACM, 1991, 0-89791-399, pp. 278-287.*
'Elements of artificial neural networks': Mehrotra, 1997, MIT Press.*

* cited by examiner

*Primary Examiner* — Kakali Chaki
*Assistant Examiner* — Peter Coughlan
(74) *Attorney, Agent, or Firm* — Mark Terry

(57) ABSTRACT

A method for legal knowledge modeling and automated legal evaluation, such as for online, questionnaire-based legal analysis, is provided. Information, such as facts and characteristics of a legal situation, as it relates to a legal conclusion, are modeled in an artificial neural network. The artificial neural network may comprise a plurality of nodes, wherein each node is associated with one or more weights and a function that calculates a legal conclusion based on one or more input values and the weights. The artificial neural network is automatically updated on a periodic basis to reflect new legislation or court decisions. Using the artificial neural network, a legal conclusion based on the user's answers to a questionnaire may be determined. The legal conclusion is modified upon the input of evidence, which is in the form of answers to a set of questions designed to identify a legal conclusion.

7 Claims, 6 Drawing Sheets

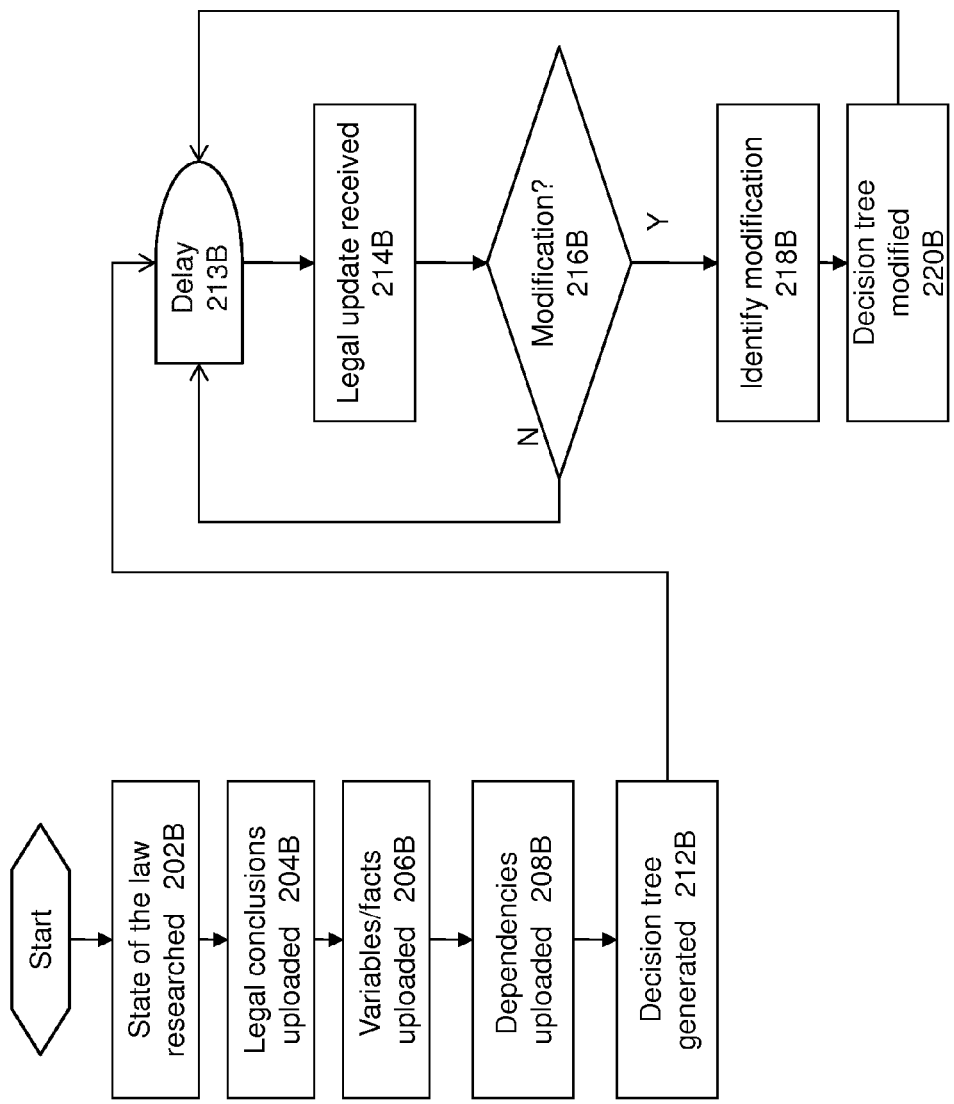

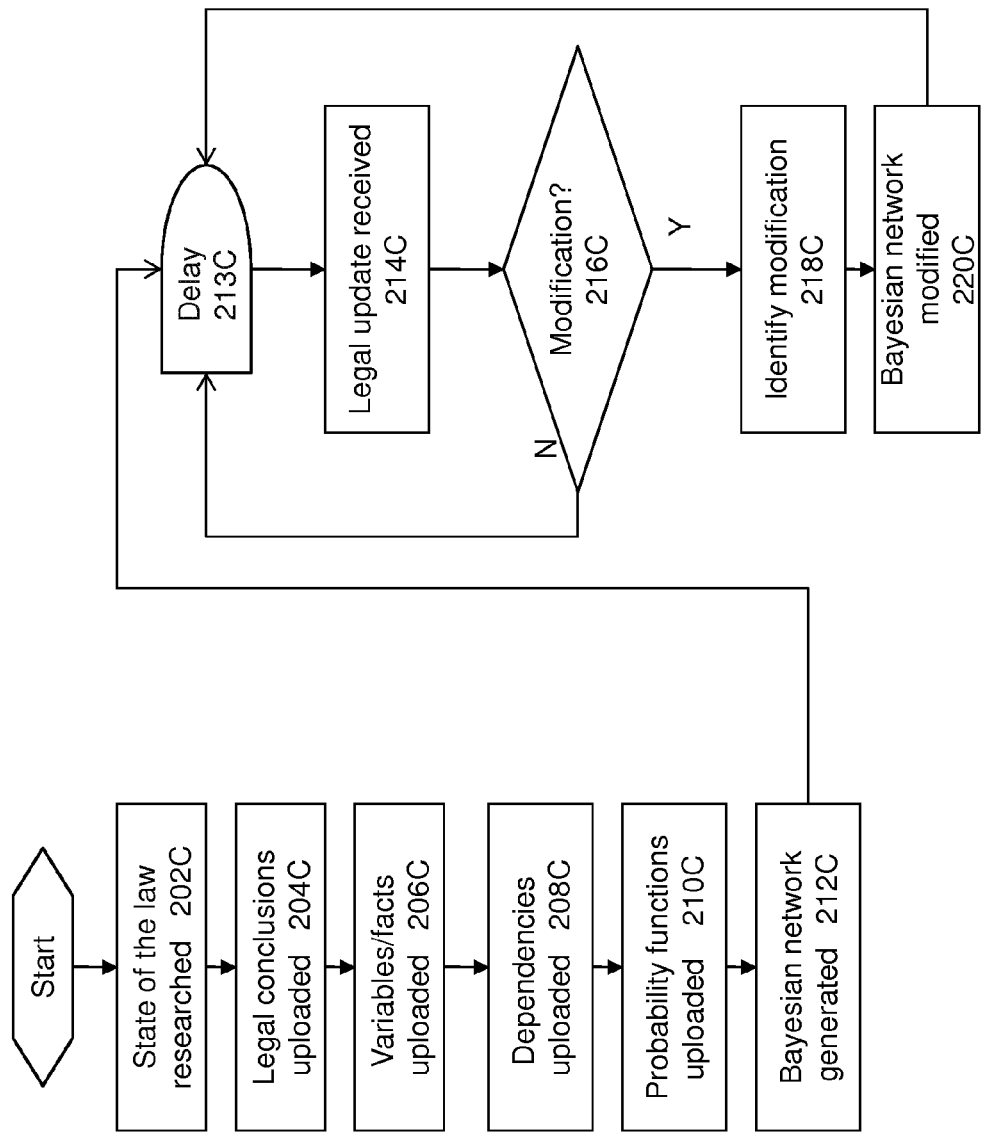

AUTOMATED LEGAL EVALUATION USING A NEURAL NETWORK OVER A COMMUNICATIONS NETWORK

CROSS-REFERENCE TO RELATED APPLICATIONS

This patent application is a continuation in part of utility patent application Ser. No. 13/163,301, filed Jun. 17, 2011, which is a continuation in part of utility patent application Ser. No. 13/029,504, filed Feb. 17, 2011, which claims priority to provisional patent application No. 61/340,312 filed Mar. 16, 2010. The subject matter of utility patent application Ser. No. 13/163,301, utility patent application Ser. No. 13/029,504 and provisional patent application No. 61/340,312 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

1. Field of the Invention

The present invention relates to the field of legal analysis and, more specifically, the present invention relates to the field of automated legal analysis over a communications network.

2. Description of the Related Art

The evaluation of a legal case or a legal scenario can be a complex undertaking. There are often a myriad of state and federal laws and regulations, as well as judge-made law, which must be taken into account in order to reach a thorough and complete legal conclusion. Often, the facts surrounding the legal situation itself can be a difficult to understand and categorize. A criminal case involving forensic accounting, for example, may include the consideration of thousands of individual facts. The complexity of such an analysis is compounded by the fact that new legislation and court decisions are issued every day that can have an effect on the legal analysis being made. For example, the U.S. Board of Patent Appeals and Interferences at the U.S. Patent and Trademark Office issues ten to twenty decisions on any given work day, any of which can make a difference in a legal analysis involving patent law. In light of the above, it is no wonder that billions of dollars are expended every year in the U.S. in the course of evaluating legal situations.

Various approaches to the problems of complex legal analysis have been disclosed. The conventional approach utilized by the majority of the legal industry today involves the time-honored routine of having an attorney or team of attorneys and other legal professionals amass all relevant facts associated with a legal scenario, conduct legal research into all relevant laws, regulations and court decisions, and write legal memorandums to explore each legal issue separately. After all of the facts have been pored over and all applicable laws have been evaluated in light of the facts, the attorney(s) generate a theory of the case, which is typically asserted in a final legal memorandum. Other than using computers to perform the tasks above, the aforementioned conventional system of legal analysis has not changed in more than a century.

As a result, when a prospective client walks into a modern lawyer's office and requests an evaluation of his case, it can often take weeks or months and many thousands of dollars until such an evaluation is complete.

One popular automated approach, often employed by vendors of tools to legal providers, involves the use of an inference engine. Modern inference engines in the legal industry typically involve sets of if-then rules that are executed to reach a legal conclusion or evaluation. The user of the inference engine begins by entering the facts of the case, often as answers to questions posed to the user, into a computer interface that reads the entries. Any if-then statements that match the given facts are executed, the result of which is a legal conclusion or final legal evaluation.

The approaches above, however, have their drawbacks. One problem with the conventional approach is its limited usability by a single user. Due to the sheer magnitude of laws, regulations and facts surrounding certain complex cases, it is simply not possible for a single attorney or other legal professional to absorb all of the applicable data and make a sound legal conclusion. Thus, in complex cases, teams of legal professionals must be employed to accomplish the task. This can be extremely costly and time intensive. Another problem with the conventional approach is user error. Since humans cannot perform at 100% accuracy for extended periods of time, there is the risk that the evaluation of hundreds of laws, regulations and court decisions may include mistakes that affect the accuracy of the final legal conclusion of the legal professional. This is an unacceptable risk in cases where large amounts of money or the freedom of the client is at stake. Finally, legal professionals are subject to their own biases, due to the party represented (plaintiff or defendant), gender, race, sexual orientation, etc. This can cloud a legal professional's judgment and affect the accuracy of his or her legal evaluation.

One problem with both the conventional approach and the inference engine approach is the lack of the ability to account for probabilities in legal evaluations. An inference engine using if-then statements, for example, reaches a hard and fast conclusion or result. That is, the result may be a "yes" or "no." In the legal world, however, guarantees of a win or loss in any given case are rarely given, since the final decision maker is a person or persons—i.e., a judge, board or jury—and decisions can vary widely. For this reason, probabilities would be a more accurate method for presenting a legal analysis. Further, the approaches above do not provide a mechanism for showing or explaining the relationships between the given facts of the case and the legal conclusions or analysis. Thus, this limits the ability of the aforementioned approaches to educate the user on how various aspects of the legal scenario interact with each other. Lastly, the approaches above do not adequately account for the fast paced issuance of new laws, regulations and court decisions that could affect the result of a legal evaluation. This brings into question the validity of any legal conclusion reached by a system that does not take the most recent laws into account.

Therefore, what is needed is a system and method for improving the problems with the prior art, and more particularly for a more efficient method and system for evaluating legal situations and scenarios.

BRIEF SUMMARY OF THE INVENTION

Embodiments of the present invention address deficiencies of the art in respect to automated legal analysis and provide a novel and non-obvious method, computer and computer program product for aiding in the analysis of a legal matter using an artificial neural network. In an embodiment of the invention, the steps performed by the method, server and computer program product of the present invention include:

(a) generating an artificial neural network representing relationships between a plurality of legal inquiries and a plurality of legal conclusions, wherein the artificial neural network comprises a plurality of nodes, wherein each node is associated with one or more weights and a function that calculates a legal conclusion based on one or more input values and the weights;
(b) providing to a user, via a graphical user interface, the plurality of legal inquiries;
(c) receiving from the user, via the graphical user interface, answers to at least a portion of the legal inquiries;
(d) calculating one or more input values for the plurality of nodes based on the answers provided by the user;
(e) executing the artificial neural network based on the one or more input values, so as to generate a resulting legal conclusion based on the answers provided by the user;
(f) displaying for the user, via the graphical user interface, the legal conclusion calculated;
(g) storing a record associated with the user, the legal conclusion calculated, the plurality of legal inquiries and the plurality of legal conclusions;
(h) receiving a legal update comprising a change in law that affects how the legal conclusions are reached;
(i) modifying the artificial neural network in light of the legal update;
(j) executing the modified artificial neural network based on the one or more input values, so as to generate a new resulting legal conclusion based on the answers provided by the user;
(k) wherein if the probability of each legal conclusion in the modified artificial neural network does not match the legal conclusion in the record that was stored, sending a message to the user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2B is a flow chart describing the control flow of the process for setting up and updating a decision tree over a communications network, in accordance with one embodiment of the present invention.

FIG. 2C is a flow chart describing the control flow of the process for setting up and updating a Bayesian network over a communications network, in accordance with one embodiment of the present invention.

DETAILED DESCRIPTION OF THE INVENTION

The present invention improves upon the problems with the prior art by providing a more effective and efficient automated method and system for providing quick and simple legal analysis using probabilities of legal conclusions or results. The present invention transforms legal principles of law into binary format using mathematic technology applied online. The present invention improves over the prior art by increasing usability by a single user, even in complex legal cases that involve large amounts of facts and numerous laws or regulations. This feature saves time and expenses by providing an empirical data-based legal conclusion in a short period of time. The present invention also improves upon the prior art by providing higher accuracy in the legal evaluation. Due to its automated nature, the present invention does not rely on a human to make legal analysis decisions, thereby reducing or eliminating the risk of making a mistake in the course of evaluating large numbers of facts, laws, regulations and court decisions. Further, the automated nature of the present invention removes the natural bias of a legal professional in the legal analysis process, thereby providing for a more accurate legal conclusion.

Further, the present invention provides a mechanism for showing or explaining the relationships between the given facts of the case and the legal conclusions or analysis, thereby providing an educational benefit to the user. Lastly, the present invention adequately accounts for the fast paced issuance of new laws, regulations and court decisions that could affect the result of a legal evaluation. The periodic update feature of the present invention provides an automated mechanism for updating legal conclusions based on new legal updates and even notifying the user if a legal conclusion has changed in light of the legal update. Lastly, the present invention further improves upon the prior art by providing the ability to account for probabilities in legal evaluations. This is advantageous since probabilities are a more practical and understandable method for presenting a legal analysis.

Figure 1:
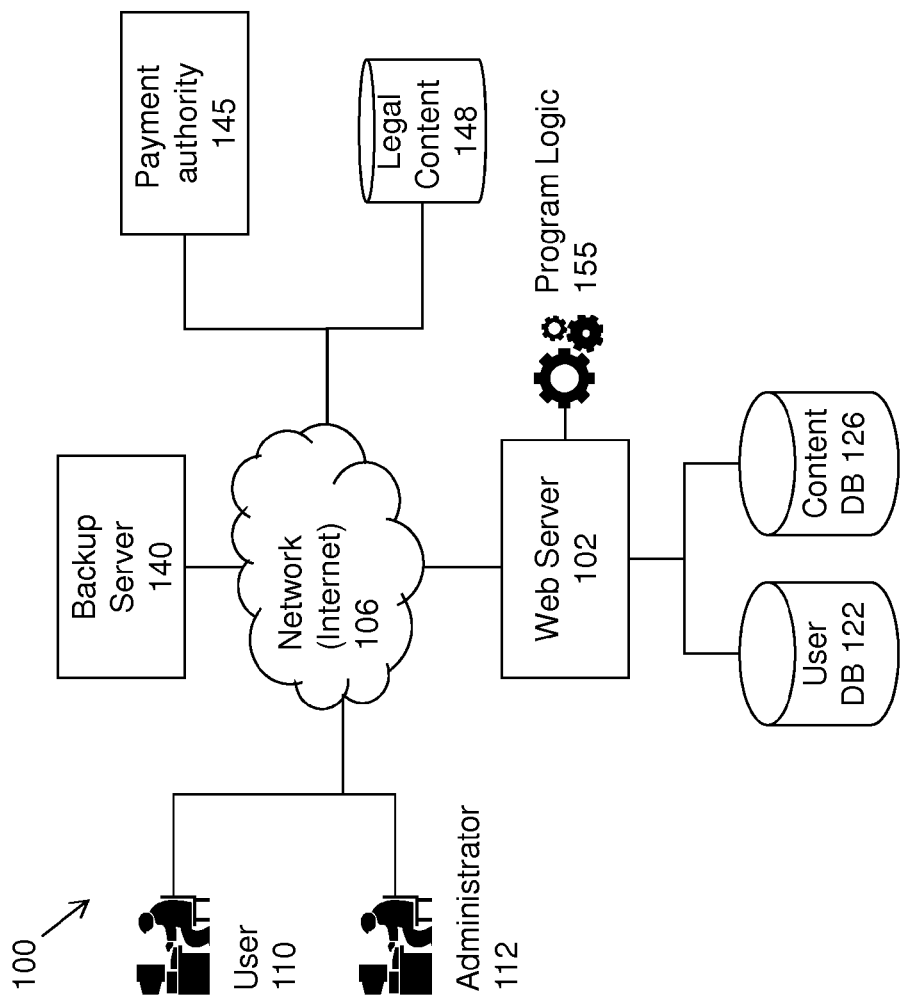
FIG. 1 is a block diagram illustrating the network architecture of a system for aiding in the analysis of a legal matter over a communications network, in accordance with one embodiment of the present invention.

Referring now to the drawing figures in which like reference designators refer to like elements, there is shown in FIG. 1 a block diagram illustrating the network architecture of a system 100 for aiding in the analysis of a legal matter over a communications network, in accordance with one embodiment of the present invention. FIG. 1 shows an embodiment of the present invention wherein users 110-112, each comprising an individual and a computer, interact with server 102 over a network 106, which can be a packet switched network such as the Internet or the World Wide Web. The computer of users 110-112 can be a desktop, a laptop, handheld computer, a smart phone, a tablet computer or the like.

Server 102, which may be a web server, is the main operative element of the present invention, executing the steps that comprise the method of the present invention. Server 102 includes a software engine that delivers applications and data content (including text files, HTML files, music files, video files, electronic book files, app files, information files, and any other media content) to users 110-112. Server 102 may also deliver data content to users 110-112 based on search parameters or identifying information selected by a client. It should be noted that although FIG. 1 shows only two users 110-112 and one server 102, the system of the present invention supports any number of client users and web servers connected via network 106.

Server 102 includes program logic 155 comprising computer source code, scripting language code or interpreted language code that is compiled to produce computer instructions that perform various functions of the present invention. In one embodiment of the present invention, the program logic is a scripting language. Program logic 155 may reside on a client computer, the server 102 or any combination of the two.

FIG. 1 further shows that server 102 is connected to a user record database 122 and a legal content database 126. Database 122 is used to store user records, such as profiles and other user account data, which have been created for each user 110-112. Database 126 stores all legal data content of the present invention. Databases 122 and 126 are collectively referred to as the "data repository" or the "central repository" for all resident data served by server 102 in the present invention. Note that although FIG. 1 shows only two databases 122 and 126, the present invention supports any number of databases holding various types of data that is served by server 102.

FIG. 1 also shows a payment authority 145 to effectuate payments by users 110-112 for legal data content. In one embodiment of the present invention, the payment authority 145 is a payment gateway that authorizes payments and transfers funds from one entity, the buyer, to another, the seller. Payment gateways accept payment via the use of credit cards, charge cards, bank cards, gift cards, account cards, etc.

FIG. 1 also shows a third party legal data content provider 148, which provides updates on legal data content. Lastly, FIG. 1 shows a backup server 140 which makes copies of data on server 102 and/or its associated databases 122 and 126, so that these additional copies may be used to restore the original after a data loss event. The backup server 140 may be used to restore a state following a disaster or to restore small numbers of files after they have been accidentally deleted or corrupted.

Note that although server 102 is shown as a single and independent entity, in one embodiment of the present invention, the functions of server 102 may be integrated with the functions of another entity, such as entities 140, 145, and 148 of FIG. 1. Further server 102 and its functionality, according to a preferred embodiment of the present invention, can be realized in a centralized fashion in one computer system, or in a distributed fashion where different elements are spread across several interconnected computer systems.

Figure 2A:
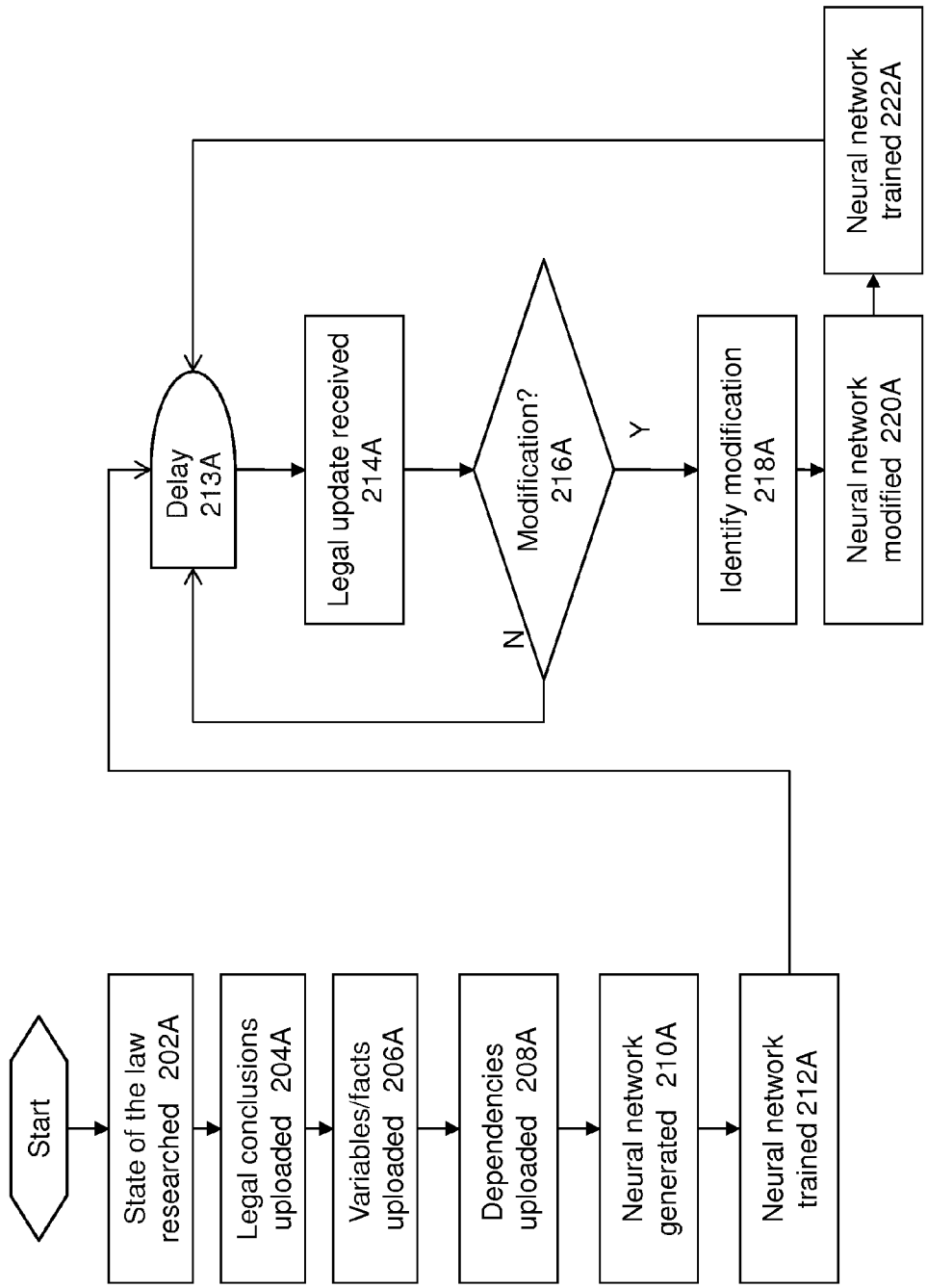
FIG. 2A is a flow chart describing the control flow of the process for setting up and updating an artificial neural network over a communications network, in accordance with one embodiment of the present invention.

FIG. 2A is a flow chart describing the control flow of the process for setting up and updating an artificial neural network over a communications network (i.e., network 106), in accordance with one embodiment of the present invention. The flow chart of FIG. 2A describes the process undertaken during the setup of an artificial neural network by the administrator 112, as well as the periodic updating of the artificial neural network. The flow chart of FIG. 2A is described in association with FIG. 1.

For exemplary purposes, a running example shall be used involving a legal query into the constitutionality or propriety of a criminal drug-related arrest of a legal client. In a first step 202A, an administrator or legal professional 112 reads or otherwise consults with the latest state of the law on a particular subject—in this case, drug-related criminal arrests. The administrator 112 may consult, for example, federal and state statutes, regulations, rules, treaties, laws, court decisions, administrative decisions, legal opinions from non-governmental authorities and the like. This step may comprise downloading or accessing legal information from a legal content provider 148 in exchange for a fee using payment authority 145. The legal content downloaded from 148 may be stored in database 126.

Based on the current state of the law on this subject, in step 204A the administrator 112 generates and uploads a set of legal conclusions to server 102. A legal conclusion is legal statement or assertion. In this example, the legal conclusions may include: a) the arrest violated the constitutional rights of the client and b) the arrest did not violate the client's constitutional rights, i.e., it is constitutional. In one alternative to the upload of legal conclusions, the administrator may upload other outcomes, such as guidance, possible courses of action, possible legal consequences, relevant and applicable case law, relevant and applicable statutes, samples of correspondence that the user may need to complete in order to pursue a particular course of action, and electronic hyperlinks to other relevant or helpful websites of any kind. That is, the administrator may upload data and educational information that is displayed for the user after he has undergone the data input process, as described, for example, in steps of 302-306 below.

In step 206A, the administrator 112 generates and uploads a set of variables representing facts relevant to the legal conclusions of step 204A. In this example, the variables representing facts may include: 1) whether the drug at issue was regulated by federal law, 2) whether the law enforcement officer had probable cause to arrest the client, and 3) whether the requisite amount of the drug at issue was found on the client's person. Numbers may be used to represent facts.

In step 208A, the administrator 112 generates and uploads a description of dependencies between the facts of step 206A and between facts and the conclusions of step 204A. For example, the administrator may specify that the conclusion of whether the arrest violated the constitutional rights of the client is dependent on the facts 1), 2) and 3) above—i.e., the question of whether the arrest violated the constitutional rights of the client is dependent on whether the drug was regulated by federal law, whether the law enforcement officer had probable cause to arrest the client and whether the requisite amount of the drug was found on the client's person.

The dependencies of step 208A may represent empirical data garnered from legal authorities, such as courts of law. In one embodiment of the present invention, the dependencies of step 208A may represent legal conclusions, as shown by empirical data pertaining to court judgments, jury decisions, judge decisions, board decisions, etc. that relate to the same legal issues and facts entered in steps 202A-206A. Further, the dependencies of step 208A may be specific to certain judges or judge panels, such that the probabilities of certain legal outcomes may be reviewed according to the identity of the judge or judges presiding over a case. The legal facts, conclusions, and dependencies of steps 204A-208A may be stored in database 126.

In one alternative, in step 208A, the administrator provides other program logic for generating a legal conclusion or decision based on one or more values of variables from one or more facts. For example, the administrator may input simple predicate logic, or other suitable AI techniques. Predicate logic is the generic term for symbolic formal systems like first-order logic, second-order logic, many-sorted logic or infinitary logic.

In step 210A, the program logic 155 of server 102 generates an artificial neural network representing relationships between variables representing facts and a plurality of legal conclusions. An artificial neural network, usually called a neural network, is a mathematical model or computational model that is inspired by the structure and/or functional aspects of biological neural networks. A neural network consists of an interconnected group of artificial neurons, or nodes, that processes information using a connectionist approach to computation. In most cases a neural network is an adaptive system that changes its structure based on external or internal information that flows through the network during the learning phase.

Figure 4:
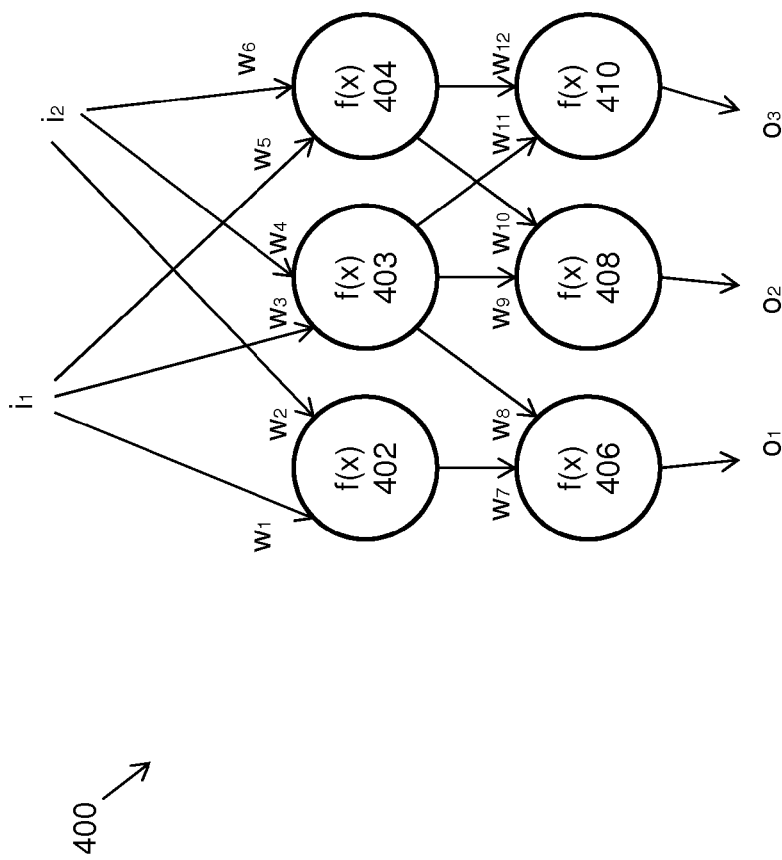
FIG. 4 is a diagram showing a depiction of an artificial neural network, in accordance with one embodiment of the present invention.

See FIG. 4, which is a diagram showing a depiction of an artificial neural network 400. Each node (402 through 410) may receive an input value, which may be real numbers, and each input path may be associated with a weight, which also may be real numbers. For example, node 402 may receive input values $i_1$, $i_2$, wherein the input path for $i_1$ may be associated with a weight $w_1$, and wherein the input path for $i_2$ may be associated with weight $w_2$. The weights are used to train the artificial neural network, as explained later. An operation, such as multiplication, may be performed on each input value/weight pair. The operation performed on the input value/weight pair may be any variety of known mathematical functions. Subsequently, a node function, f(x), is performed on the results of all of the input value/weight pair operations. The node function, f(x), may be any variety of known mathematical functions, such as the identity function, the threshold logic function and the sigmoid function. For example, a summation may be executed wherein the results of all of the input value/weight pair operations are added. For example, the input value/weight pair operations for node 402 may be: $i_1 \times w_1$ and $i_2 \times w_2$. Further, the node function f(x) for node 402 may be: $f(x)=(i_1 \times w_1)+(i_2 \times w_2)$.

Depending on the result of the node function, a node outputs a value, which may be a real number. Outputs of nodes 406, 408 and 410 are shown as $o_1$, $o_2$ and $o_3$, respectively. In one embodiment, a step function is used wherein if the result of the node function is greater than a threshold value, the node outputs a value. If the result of the node function is less than the threshold value, the node outputs zero. In another embodiment, a variable function is used wherein the output value is proportional to or dependant on the result of the node function.

Note that nodes may be connected such that the output from one node or nodes may serve as the input for another node or nodes. For example, see that outputs from the left most node in set 402 and the middle node of set 402 serve as the input paths for the left most node of set 404. Note also that there may be varying or different node functions for each of the nodes 402-410.

The artificial neural network of step 210A is based on the legal conclusions, variables, and dependencies defined in steps 204A-208A. Step 210A includes generating one or more nodes that produce one or more of the legal conclusion of step 204A. Step 210A further includes defining the node functions for each node, as defined below. Step 210A further includes defining the weights used by the node functions, f(x), which produce the output values that represent the legal conclusions. Lastly, step 210A includes inserting edges between nodes, wherein an edge represents a conditional dependency between nodes, as those dependencies may be defined in step 208A. For example, if an output node, such as node 406 (which outputs whether an arrest is constitutional), is dependent on an intermediate node, such as node 402 (which outputs whether a drug is regulated by federal law), then a dependency edge is inserted between node 402 and node 406, such that the output of node 402 serves as the input path to node 406, as shown in FIG. 4.

A node function may take as input one or more input values (such as $i_1$, $i_2$) from one or more facts on which the legal conclusion depends. Based on the values of those variables, the node function provides a legal conclusion via an output, such as $o_1$, $o_2$ and $o_3$. For example, the administrator may specify a node function with an output indicating that an arrest did not violate the constitutional rights of the client if the facts, i.e., inputs, indicate that the drug was regulated by federal law and the law enforcement officer had probable cause to arrest the client. The same node function, however, may have an output indicating that an arrest violated the constitutional rights of the client if the facts, i.e., inputs, indicate that the drug was not regulated by federal law and the law enforcement officer did not have probable cause to arrest the client.

The node functions of step 210A may represent empirical data garnered from legal authorities, such as courts of law. In one embodiment of the present invention, the node functions of step 210A may represent the probabilities of certain legal outcomes, as shown by empirical data pertaining to court judgments, jury decisions, judge decisions, board decisions, etc. that relate to the same legal issues and facts entered in steps 202A-206A. Further, the probability functions of step 210A may be specific to certain judges or judge panels, such that the probabilities of certain legal outcomes may be reviewed according to the identity of the judge or judges presiding over a case. The legal facts, conclusions, dependencies and node functions of steps 204A-210A may be stored in database 126.

Next, in step 212A, the artificial neural network undergoes training. Training comprises a set of operations that define the weights for an artificial neural network. There are three major learning paradigms for an artificial neural network—supervised learning, unsupervised learning and reinforcement learning—all of which are well known in the art.

In step 213A, a period of time passes. In step 214A, a legal update is received by server 102. A legal update may comprise new legislation, laws or regulations or a new court or administrative decision. Since legislation, laws, regulations and court or administrative decisions affect the way legal conclusions are reached, it is possible that a legal update can change the way a legal conclusion was reached. For example, there may be a law stating that alcohol is illegal, and therefore a legal conclusion may be reached, based on that law, that a person is guilty of a crime. But if a legal update comprises a repeal of the law, thereby making alcohol legal, then the legal conclusion regarding the guilt of the person may change.

In step 216A it is determined whether the artificial neural network necessitates modification in light of the legal update. In one embodiment, step 216A may be performed automatically by program logic 155 and in another embodiment, step 216A may be performed with the assistance of an administrator 112, wherein the administrator reviews the legal update and provides instructions to the server 102 as to whether the artificial neural network must be modified. If the artificial neural network must be modified, control flows to step 218A. Otherwise, control flows back to step 213A.

In step 218A, it is determined how the artificial neural network must be modified in light of the legal update. In one embodiment, step 218A may be performed automatically wherein the program logic 155: a) automatically identifies which of the weights, functions, nodes, edges, facts or plurality of legal conclusions should be deleted, b) automatically identifies how one or more weights, functions, nodes, edges, facts or plurality of legal conclusions should be modified and c) automatically identifies which weights, functions, nodes, edges, facts or legal conclusions should be added to the artificial neural network. In another embodiment, step 218A may be performed with the assistance of an administrator 112, wherein the administrator reviews the legal update and provides a description to the server 102 of whether weights, functions, nodes, edges, facts or legal conclusions should be deleted, modified or added.

In step 220A, the artificial neural network is modified as defined in step 218A. In one embodiment, the modification is performed automatically by program logic 155. In another embodiment, the modification is performed with the assistance of administrator 112. In this embodiment, the items identified in step 218A are presented to the administrator via a graphical user interface so that the administrator may review the items and decide how to modify the artificial neural network. Subsequently, the administrator may manually modify the weights, functions, nodes, edges, facts or plurality of legal conclusions of the artificial neural network. Subsequently, in step 222A, the newly modified neural network is re-trained with the new modifications, as in step 212A. Control then flows back to step 213A.

FIG. 2B is a flow chart describing the control flow of the process for setting up and updating a decision tree over a communications network (i.e., network 106), in accordance with one embodiment of the present invention. The flow chart of FIG. 2B describes the process undertaken during the setup of a decision tree by the administrator 112, as well as the periodic updating of the decision tree. The main difference between the flow chart of FIG. 2B and that of FIG. 2A is that FIG. 2B involves a decision tree, instead of an artificial neural network. The flow chart of FIG. 2B is described in association with FIG. 1.

For exemplary purposes, the aforementioned running example shall be used. In a first step 202B, an administrator or legal professional 112 reads or otherwise consults with the latest state of the law on a particular subject—in this case, drug-related criminal arrests. Step 202B may be similar to step 202A.

Based on the current state of the law on this subject, in step 204B the administrator 112 generates and uploads a set of legal conclusions to server 102. Step 204B may be similar to step 204A. In step 206B, the administrator 112 generates and uploads a set of variables representing facts relevant to the legal conclusions of step 204B. In step 208B, the administrator 112 generates and uploads a description of dependencies between the facts of step 206B and between facts and the conclusions of step 204B. The dependencies of step 208B may be similar to the dependencies of step 208A.

In one alternative, like step 208A, in step 208B, the administrator provides other program logic for generating a legal conclusion or decision based on one or more values of variables from one or more facts.

In step 212B, the program logic 155 of server 102 generates a decision tree representing relationships between variables representing facts and a plurality of legal conclusions. A decision tree is a decision support tool that uses a tree-like graph or model of decisions and their possible consequences, including chance event outcomes, resource costs, and utility. The decision tree of step 212B is based on the legal conclusions, variables, and dependencies defined in steps 204B-208B. Step 212B includes generating a node for each legal conclusion of step 204B and a node for each set of variables representing facts (of step 206B) relevant to the legal conclusions. Step 212B further includes inserting edges between nodes, wherein an edge represents a conditional dependency between variables of nodes, as those dependencies are defined in step 208B. For example, if a conclusion node (representing the legal conclusion that an arrest is constitutional) is dependent on a variable node (representing the fact that a drug is regulated by federal law), then a dependency edge is inserted between the aforementioned conclusion node and variable node.

The decision tree generated in step 212B may be a simple decision tree, a binary tree, a linear decision tree, an algebraic decision tree, a deterministic decision tree, a randomized decision tree, a nondeterministic decision tree, a quantum decision tree or the like. In one simplified example, a node is generated to represent a set of variables. Following the form of an if-then statement, if certain conditions are met by the variables of the node, then the edges emanating from the node dictate the legal conclusion that is inferred from those variables. Thus, an if-then statement of the form "if A and B, then C" may be represented by a first node that holds the variables of the legal conclusion. Emanating from the first node is an edge that connects to a legal conclusion node holding the conclusion "C," wherein the edge requires that the variables "A" and "B" are true. At the time of execution of the decision tree, if in fact variables "A" and "B" are true, then the edge emanating from the first node leads to the legal conclusion "C."

In step 213B, a period of time passes. In step 214B, a legal update is received by server 102. A legal update may comprise new legislation, laws or regulations or a new court or administrative decision. In step 216B it is determined whether the decision tree necessitates modification in light of the legal update. In one embodiment, step 216B may be performed automatically by program logic 155 and in another embodiment, step 216B may be performed with the assistance of an administrator 112, wherein the administrator reviews the legal update and provides instructions to the server 102 as to whether the decision tree must be modified. If the decision tree must be modified, control flows to step 218B. Otherwise, control flows back to step 213B.

In step 218B, it is determined how the decision tree must be modified in light of the legal update. In one embodiment, step 218B may be performed automatically wherein the program logic 155: a) automatically identifies which of the nodes, edges, facts or plurality of legal conclusions should be deleted, b) automatically identifies how one or more nodes, edges, facts or plurality of legal conclusions should be modified and c) automatically identifies which nodes, edges, facts or legal conclusions should be added to the decision tree. In another embodiment, step 218B may be performed with the assistance of an administrator 112, wherein the administrator reviews the legal update and provides a description to the server 102 of whether nodes, edges, facts or legal conclusions should be deleted, modified or added.

In step 220B, the decision tree is modified as defined in step 218B. In one embodiment, the modification is performed automatically by program logic 155. In another embodiment, the modification is performed with the assistance of administrator 112. In this embodiment, the items identified in step 218B are presented to the administrator via a graphical user interface so that the administrator may review the items and decide how to modify the decision tree. Subsequently, the administrator may manually modify the nodes, edges, facts or plurality of legal conclusions of the decision tree. Control then flows back to step 213B.

Note that FIG. 2B shows the process for setting up and updating a decision tree while FIG. 2A shows the process for setting up and updating an artificial neural network. In one embodiment of the present invention, both processes of FIG. 2A and FIG. 2B are executed and the results, i.e., legal conclusions, are used to complement or augment one another. In this embodiment, the user 110 may be presented with both sets of results so as to get a deeper understanding, and be provided a more in-depth conclusion, for the legal scenario being evaluated.

In another embodiment, the present invention allows for the creation of a hybrid decision tree/neural network, wherein some of the nodes are decision tree nodes and some are neural network nodes. In this embodiment, the execution of the hybrid decision tree/neural network produces a combination of a legal conclusion and probabilities related to each legal conclusion. In one alternative, the first set of nodes of the hybrid decision tree/neural network are decision tree nodes while the remaining nodes are neural network nodes or vice versa.

FIG. 2C is a flow chart describing the control flow of the process for setting up and updating a Bayesian network over a communications network (i.e., network 106), in accordance with one embodiment of the present invention. The flow chart of FIG. 2C describes the process undertaken during the setup of a Bayesian network by the administrator 112, as well as the periodic updating of the network. The main difference between the flow chart of FIG. 2B and that of FIG. 2C is that FIG. 2C involves a Bayesian network, instead of a decision tree. The flow chart of FIG. 2C is described in association with FIG. 1.

For exemplary purposes, the aforementioned running example involving the constitutionality or propriety of a criminal drug-related arrest shall be used. In a first step 202C, an administrator or legal professional 112 reads or otherwise consults with the latest state of the law on a particular subject, as in step 202B above. Based on the current state of the law on this subject, in step 204C the administrator 112 generates and uploads a set of legal conclusions to server 102.

In step 206C, the administrator 112 generates and uploads a set of variables representing facts relevant to the legal conclusions of step 204C. In step 208C, the administrator 112 generates and uploads a description of dependencies between the facts of step 206C and between facts and the conclusions of step 204C.

In step 210C, the administrator 112 generates and uploads probability functions for the conclusions of step 204C. A probability function takes as input one or more values of variables from one or more facts on which the legal conclusion depends. Based on the values of those variables, the probability function provides a probability that the legal conclusion is true. For example, the administrator may specify a probability function dictating that the probability the arrest did not violate the constitutional rights of the client is 70% if the facts showed only that the drug was regulated by federal law and the law enforcement officer had probable cause to arrest the client. The same probability function, however, may dictate that the probability the arrest did not violate the constitutional rights of the client is only 20% if the facts showed only that the requisite amount of the drug was found on the client's person.

The probability functions of step 210C may represent empirical data garnered from legal authorities, such as courts of law. In one embodiment of the present invention, the probability functions of step 210C may represent the probabilities of certain legal outcomes, as shown by empirical data pertaining to court judgments, jury decisions, judge decisions, board decisions, etc. that relate to the same legal issues and facts entered in steps 202C-206C. Further, the probability functions of step 210C may be specific to certain judges or judge panels, such that the probabilities of certain legal outcomes may be reviewed according to the identity of the judge or judges presiding over a case. The legal facts, conclusions, dependencies and probability functions of steps 204C-210C may be stored in database 126.

In step 212C, the program logic 155 of server 102 generates a Bayesian network representing probabilistic relationships between variables representing facts and a plurality of legal conclusions. The Bayesian network of step 212C is based on the legal conclusions, variables, dependencies, and probability functions defined in steps 204C-210C. Step 212C includes generating a node for each legal conclusion of step 204C and a node for each set of variables representing facts (of step 206C) relevant to the legal conclusions. Step 212C further includes inserting edges between nodes, wherein an edge represents a conditional dependency between variables of nodes, as those dependencies are defined in step 208C. Lastly, the probability functions defined in step 210C are entered in each node representing a legal conclusion.

A Bayesian Network may comprise, and the present invention may generate, via step 212C, instantiable nodes, fault nodes, intermediary nodes, a utility node and a decision node. Instantiable nodes are nodes into which evidence is entered. Usually, they will correspond to questions with discrete or continuous input that are instantiated by the user; i.e., evidence "observed" by the user will be entered to the network at these nodes. Fault nodes are output nodes, the results of which are of interest to the user. Decisions and the information sought to be provided by the network are modeled in these nodes. These nodes are not instantiated. They are monitored for answers that are needed. In a network, there can be more than one fault node, and as a result, fault nodes may be interpreted in conjunction or separately. For example, one fault node could provide the legal conclusion level, and another fault node could provide the overall legal status of the client. Intermediary nodes are neither instantiated nor monitored or faulted. Their purpose is grouping and at times simplifying the overall network design. Utility nodes provide the quantitative background for a decision node to make a decision. The utility node comprises a table of values representing utilities for various decisions given a state in the chief complaint fault node. A decision node calculates a utility value for all states in the decision node. To do this, the decision node uses a table of corresponding utility values for all states in the chief complaint fault node.

Decision nodes are fault nodes. The decision node will have different decisions as its states. At any given time based on probabilities for different states in the diagnosis fault node and table of utilities in the utility node a utility value will be calculated for all states of the decision node. Utilities are provided such that the state with greatest utility will be considered the best decision. Decisions could be of any nature. Examples include a legal situation where the goal would be to find out if the client's legal rights have been violated.

In step 213C, a period of time passes. In step 214C, a legal update is received by server 102. A legal update may comprise new legislation, laws or regulations or a new court or administrative decision. In step 216C it is determined whether the Bayesian network necessitates modification in light of the legal update. In one embodiment, step 216C may be performed automatically by program logic 155 and in another embodiment, step 216C may be performed with the assistance of an administrator 112, wherein the administrator reviews the legal update and provides instructions to the server 102 as to whether the Bayesian network must be modified. If the network must be modified, control flows to step 218C. Otherwise, control flows back to step 213C.

In step 218C, like step 218B above, it is determined how the Bayesian network must be modified in light of the legal update. In step 220C, like step 220B above, the Bayesian network is modified as defined in step 218C. Control then flows back to step 213C.

Note that FIG. 2C shows the process for setting up and updating a Bayesian network while FIG. 2B shows the process for setting up and updating a decision tree and FIG. 2A shows the process for setting up and updating a neural network. In one embodiment of the present invention, processes of FIGS. 2A, 2B and 2C are executed and the results, i.e., legal conclusions, are used to complement or augment one another. In this embodiment, the user 110 may be presented with both sets of results so as to get a deeper understanding, and be provided a more in-depth conclusion, for the legal scenario being evaluated.

In another embodiment, the present invention allows for the creation of a hybrid decision tree/Bayesian network/neural network, wherein some of the nodes are decision tree nodes, some are Bayesian network nodes and some are neural network nodes. In this embodiment, the execution of the hybrid decision tree/Bayesian network/neural network produces a combination of a legal conclusion and probabilities related to each legal conclusion. In one alternative, the nodes of the hybrid network can be a combination of decision tree, Bayesian network, or neural network nodes.

Figure 3:
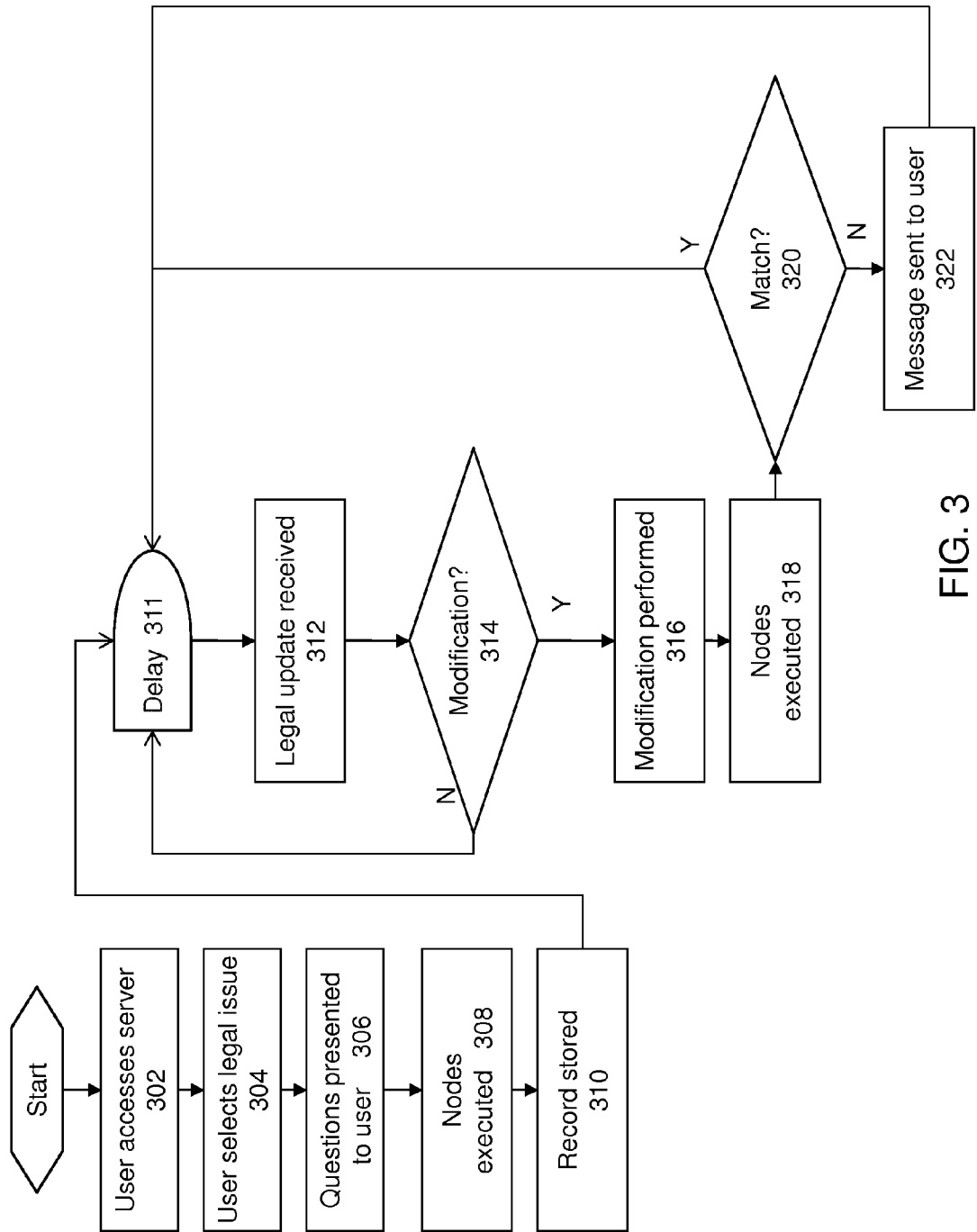
FIG. 3 is a flow chart describing the control flow of the process for executing a decision tree, Bayesian network and/or neural network over a communications network, in accordance with one embodiment of the present invention.

FIG. 3 is a flow chart describing the control flow of the process for executing a decision tree, Bayesian network, or neural network over a communications network, in accordance with one embodiment of the present invention. The flow chart of FIG. 3 describes the process undertaken during the use of a decision tree, Bayesian network, and/or neural network by a user 110 over the network 106. The flow chart of FIG. 3 is described in association with FIG. 1. The running example involving the legal query into the constitutionality of a drug-related arrest of a legal client will continue to be used herein.

In step 302, the user 110 accesses the web server 102 over the network 106. In step 304, the user 110 identifies the legal issue he would like to analyze. The user 110 may provide a search parameter to server 102, which may respond with a list of legal issues from which user 110 may select. For example, the user 110 may specify "drug-related arrests" as his legal topic of choice. Based on this selection, the program logic 155 accesses the decision tree, Bayesian network, and/or neural network corresponding to the legal issue identified by the user 110. In step 306 the user 110 is presented with a graphical user interface that displays a series of legal inquiries, each corresponding to a legal fact. For example, the user 110 may be presented with questions such as: 1) Was the drug at issue a Schedule 1 drug such as heroin? 2) Was the drug at issue found by a police officer on your person? 3) How much of the drug at issue was found on your person? Subsequently, the user 110 provides his answers to the legal inquiries via the graphical user interface.

In step 308, program logic 155 executes the nodes of the decision tree, Bayesian network, and/or neural network based on the answers provided by the user 110. If a node is a Bayesian network node, then program logic 155 executes the probability functions of the node based on the answers provided by the user 110 in step 306, thereby calculating the probability of each legal conclusion based on the answers. If a node is a decision tree node, then program logic 155 executes the statement, such as an if-then statement, of the node based on the answers provided by the user 110 in step 306, thereby calculating the resulting legal conclusion based on the answers. If a node is a neural network node, then program logic 155 executes the node functions of each node based on the answers (i.e., inputs) provided by the user 110 in step 306, thereby calculating the resulting legal conclusion based on the answers.

Consequently, the graphical user interface displays each legal conclusion, and/or the probability thereof, to user 110 via a graphical user interface. In one alternative to the display of legal conclusions, or probabilities, the interface may display guidance, possible courses of action, possible legal consequences, relevant and applicable case law, relevant and applicable statutes, samples of correspondence that the user may need to complete in order to pursue a particular course of action, and electronic hyperlinks to other relevant or helpful websites of any kind.

In step 310, a record associated with the user 110 is stored in database 122. The record may also be associated with each legal conclusion, or probability thereof, as displayed for the user 110, the plurality of legal inquiries, the answers provided by the user and the plurality of legal conclusions. In step 311, a period of time passes. In step 312, a legal update is received. In step 314 (which may be executed in the same manner as steps 216A, 216B or 216C), it is determined whether the legal update comprises a change in law affecting how the legal conclusions are reached. If the legal update comprises a change in law, then control flows to step 316. Otherwise control flows back to step 311.

In step 316, the decision tree, Bayesian network, and/or neural network is modified in light of the legal update. See FIGS. 2A-2C above for a description of how the decision tree, Bayesian network, and/or neural network can be modified. In step 318, previous step 308 is re-executed. That is, the modified decision tree, Bayesian network, and/or neural network is executed using the answers provided by the user 110, thereby re-calculating each legal conclusion, and/or the probability thereof, based on the answers provided by the user. In step 320, it is determined whether each legal conclusion, and/or the probability thereof, in the modified decision tree, Bayesian network, and/or neural network matches each legal conclusion, and/or the probability thereof, in the record that was stored in step 310. If there is a match, then control flows back to step 311. If there is no match, then a message, such as an email message, is sent to the user 110 in step 322, notifying him of the discrepancy.

In addition to the implementations described above with relation to automated legal analysis, the present invention can also be used in other decision-making capacities, such as medical diagnosis, evaluation of infrastructures via an engineering inspection, network health analysis and building code compliance. In other embodiments, the present invention may be used as an educational tool that highlights the most pertinent aspects of a decision-making process.

The present invention can be realized in hardware, software, or a combination of hardware and software in the system described in the figures above. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, disk drive memory, CD-ROM, and other permanent storage. Additionally, a computer readable medium may include, for example, volatile storage such as RAM, buffers, cache memory, and network circuits.

In this document, the terms "computer program medium," "computer usable medium," and "computer readable medium" are used to generally refer to media such as main memory removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method on a computer for aiding in the analysis of a legal matter using an artificial neural network and a Bayesian network, comprising:
   generating an artificial neural network representing relationships between a plurality of legal inquiries and a plurality of legal conclusions, wherein the artificial neural network comprises a plurality of nodes, wherein each node is associated with one or more weights and a function that calculates a legal conclusion based on one or more input values and the weights;
   generating a Bayesian network representing probabilistic relationships between a plurality of legal inquiries and a plurality of legal conclusions, wherein the Bayesian network comprises a plurality of nodes and a plurality of edges connecting the nodes, wherein each node is associated with a variable that represents either an answer to a legal inquiry or a legal conclusion, and an edge represents a conditional dependency between variables of nodes;
   associating a probability function with each node, wherein a probability function takes as input one or more values of variables from one or more parent nodes and gives a probability of a child node's variable;
   providing to a user, via a graphical user interface, the plurality of legal inquiries;
   receiving from the user, via the graphical user interface, answers to at least a portion of the legal inquiries;
   calculating one or more input values for the plurality of nodes of the artificial neural network based on the answers provided by the user;
   replacing a variable of each node of the Bayesian network corresponding to an answer provided by the user with a value representing the answer;
   executing the artificial neural network based on the one or more input values, so as to generate a resulting legal conclusion based on the answers provided by the user;
   executing the probability function of each node of the Bayesian network, thereby calculating the probability of each legal conclusion based on the answers provided by the user;
   displaying for the user, via the graphical user interface, the legal conclusion calculated via the artificial neural network and the probability of each legal conclusion from the Bayesian network;
   storing a record associated with the user, including the legal conclusion calculated via the artificial neural network, the probability of each legal conclusion from the Bayesian network, the plurality of legal inquiries and the plurality of answers;
   receiving a legal update comprising a change in law that affects how the legal conclusions are reached in the artificial neural network and how the probability of each legal conclusion is reached in the Bayesian network;
   modifying the artificial neural network and the Bayesian network in light of the legal update;
   executing the modified artificial neural network based on the one or more input values, so as to generate a new resulting legal conclusion based on the answers provided by the user;
   executing the probability function of each node in the modified Bayesian network, thereby re-calculating the probability of each legal conclusion based on the answers provided by the user; and
   wherein if the legal conclusion in the modified artificial neural network does not match the legal conclusion in the record that was stored, or if the probability of each legal conclusion in the modified Bayesian network does not match the probability of each legal conclusion in the record that was stored, sending a message to the user.

2. The method of claim 1, wherein the step of providing to a user the plurality of legal inquiries comprises:
   providing to a remote user, over a communication network via a graphical user interface, the plurality of legal inquiries.

3. The method of claim 2, wherein the step of receiving from the user answers to at least a portion of the legal inquiries: comprises:
   receiving from the remote user, over a communication network via the graphical user interface, answers to at least a portion of the legal inquiries.

4. The method of claim 3, wherein the step of displaying for the user the probability of each legal conclusion comprises:
   displaying for the remote user, over a communication network via the graphical user interface, the legal conclusion that was calculated.

5. The method of claim 4, wherein the step of sending a message to the user comprises:
   generating and sending an email to the user specifying that the legal conclusion previously provided to the user has changed.

6. The method of claim 4, wherein the step of sending a message to the user comprises:
   generating a sending a text message to the user specifying that the legal conclusion previously provided to the user has changed.

7. The method of claim 1, wherein the step of receiving a legal update comprises:
   receiving an automated legal update over a communication network.

\* \* \* \* \*